United States Patent
Marx et al.

(10) Patent No.: US 10,850,544 B2
(45) Date of Patent: Dec. 1, 2020

(54) METHOD FOR PRODUCING A STAMP IMPRESSION WITH UV-CURABLE INK WITH A PREFERABLY SELF-INKING STAMP, AND STAMP FOR THIS PURPOSE

(71) Applicant: Trodat GmbH, Wels (AT)

(72) Inventors: Christoph Marx, Klosterneuburg (AT); Helmut Lindner, Peuerbach (AT); Peter Zindl, Marchtrenk (AT)

(73) Assignee: Trodat GmbH

( * ) Notice: Subject to any disclaimer, the term of this patent is extended or adjusted under 35 U.S.C. 154(b) by 0 days.

(21) Appl. No.: 16/338,643

(22) PCT Filed: Sep. 18, 2017

(86) PCT No.: PCT/AT2017/060234
§ 371 (c)(1),
(2) Date: Apr. 1, 2019

(87) PCT Pub. No.: WO2018/058160
PCT Pub. Date: Apr. 5, 2018

(65) Prior Publication Data
US 2020/0039268 A1 Feb. 6, 2020

(30) Foreign Application Priority Data

Sep. 30, 2016 (AT) ............... A 50880/2016

(51) Int. Cl.
*B41K 1/36* (2006.01)
*B41K 1/42* (2006.01)
(Continued)

(52) U.S. Cl.
CPC .................. *B41K 1/42* (2013.01); *B41K 1/02* (2013.01); *B41K 1/50* (2013.01); *C08L 33/12* (2013.01); *C08L 69/00* (2013.01); *C09D 11/101* (2013.01)

(58) Field of Classification Search
CPC ... B41K 1/02; B41K 1/36; B41K 1/38; B41K 1/40; B41K 1/42; B41K 1/50; B41M 1/26;
(Continued)

(56) References Cited

U.S. PATENT DOCUMENTS 5,827,134 A 10/1998 Sullivan et al.
2009/0004406 A9 * 1/2009 Argoitia .................. B05D 3/207
427/598

(Continued)

FOREIGN PATENT DOCUMENTS

AT 9206 U1 6/2007
AT 507833 A2 8/2010
(Continued)

OTHER PUBLICATIONS

International Search Report for PCT/AT2017/060234 dated Jan. 30, 2018.

*Primary Examiner* — Leslie J Evanisko
(74) *Attorney, Agent, or Firm* — Lerner, David, Littenberg, Krumholz & Mentlik, LLP

(57) ABSTRACT

A method includes producing a stamp impression with UV-curable ink with a preferably self-inking stamp. A stamp for this purpose, includes a text plate with the negative stamp impression is moved from a resting position into a stamping position, whereby in the stamping position the stamp impression with the ink is produced on a preferably smooth surface of a document or object or workpiece, and then the text plate is returned to the resting position, wherein a controller is activated, wherein for the curing of the ink at least one or several irradiation sources arranged on the stamp is or are, respectively, switched on, with UV rays aligned in the direction of a printing surface.

26 Claims, 6 Drawing Sheets

(51) Int. Cl.
*B41K 1/02* (2006.01)
*B41K 1/50* (2006.01)
*C08L 33/12* (2006.01)
*C08L 69/00* (2006.01)
*C09D 11/101* (2014.01)

(58) Field of Classification Search
CPC ........ B41M 1/28; B41M 1/34; B41M 7/0045; B41M 7/0081; B41F 23/04; B41F 23/045; B41F 23/0453; B05C 3/067
USPC ....... 101/103, 104, 109, 327, 333, 334, 405, 101/406, 491; D18/15
See application file for complete search history.

(56) References Cited

U.S. PATENT DOCUMENTS

| | | |
|---|---|---|
| 2011/0277647 A1 | 11/2011 | Zindl et al. |
| 2012/0297998 A1 | 11/2012 | Zehetner et al. |
| 2016/0152058 A1 | 6/2016 | Zehetner et al. |

FOREIGN PATENT DOCUMENTS

| | | | |
|---|---|---|---|
| AT | 511453 A4 | 12/2012 | |
| CA | 2748540 A1 | 8/2010 | |
| DE | 7601070 U1 | 7/1977 | |
| DE | 202011103397 U1 | 10/2011 | |
| EP | 2384283 B1 | 4/2013 | |
| EP | 2591919 A1 | 5/2013 | |
| EP | 2591920 B1 | 2/2014 | |
| EP | 2591921 B1 | 2/2014 | |
| JP | 2007216534 A * | 8/2007 | |
| WO | 2011020608 A2 | 2/2011 | |
| WO | 2012159728 A2 | 11/2012 | |
| WO | WO-2019183655 A1 * | 10/2019 | .............. F26B 9/003 |

\* cited by examiner

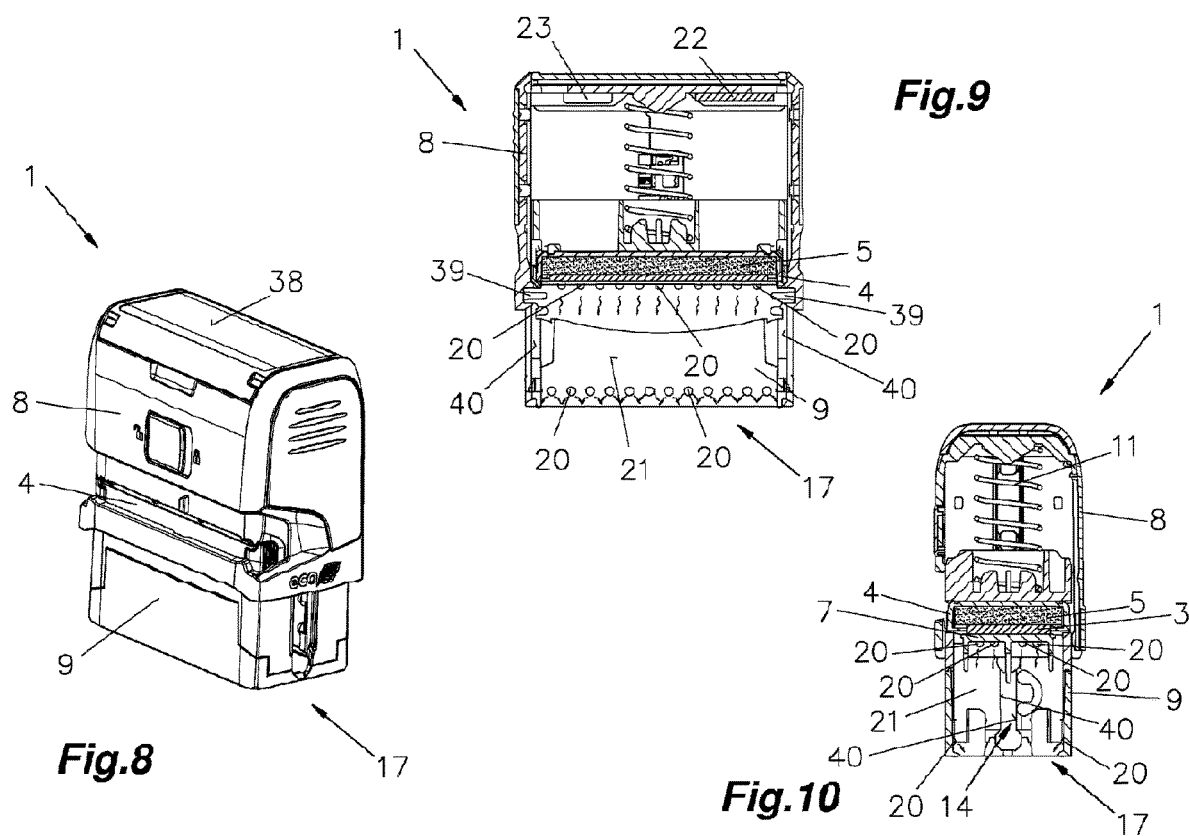

METHOD FOR PRODUCING A STAMP IMPRESSION WITH UV-CURABLE INK WITH A PREFERABLY SELF-INKING STAMP, AND STAMP FOR THIS PURPOSE

CROSS-REFERENCE TO RELATED APPLICATIONS

This application is a national phase entry under 35 U.S.C. § 371 of International Application No. PCT/AT2017/060234 filed Sep. 18, 2017, which claims the priority from Austrian Patent Application No. A 50880/2016 filed Sep. 30, 2016, the entire contents of which are hereby incorporated by reference.

FIELD OF THE INVENTION

The present invention relates to a process or method for making a stamp impression with UV-curable ink with a preferably self-inking stamp, and to a stamp as described in the claims.

BACKGROUND OF THE INVENTION

A stamp is known from AT 009 206 U in which an ink cartridge with pad soaked with ink is used for increased protection against forgery, wherein one or a plurality of different inks is provided, wherein at least one UV ink or at least one of the inks contains UV ink particles that are visible only when irradiated with UV light.

A disadvantage here is that the stamp impression can easily be blurred on difficult surfaces such as glass, metal, aluminium, cardboard, etc.

In order to avoid the blurring of a stamp impression, DE 7601070 U discloses a device for curing the stamp ink of a stamp impression on an object or workpiece, respectively, in which a guide rail for receiving the lamp or workpiece to be irradiated is arranged in a housing with perforated base and cover plates, wherein a metal halide lamp with a high UV portion as UV irradiation source is arranged at a distance of about 30 mm from the imprint on the lamp.

The disadvantage here is that the object or workpiece, respectively, in particular the lamp to be irradiated, must first be provided with a stamp impression, after which this can be placed in the drying device. However, there is a risk that the stamp impression will be blurred upon insertion. Likewise, only smaller objects can be inserted in such a device.

SUMMARY OF THE INVENTION

The objective of the invention is to create a process or method for producing a stamp impression with UV-curable ink using a preferably self-inking stamp and a stamp that eliminates the above disadvantages, and allows rapid drying of a stamp impression on most surfaces and on workpieces of any size.

The objective is achieved by the invention.

The objective of the invention is solved by a process or method for producing a stamp impression with curable ink using a preferably self-inking stamp in which a controller is activated, wherein at least one or a plurality of irradiation sources arranged on the stamp is or are, respectively, switched on, with UV rays aligned in the direction of a printing surface for the curing of the ink.

The advantage here is that the use of additional components for the curing of the ink ensures that blurring of the stamp impression is avoided. This is particularly advantageous when using an ink with a very long curing time, wherein the curing time can be significantly shortened by using certain irradiation options, in particular UV irradiation. A further essential advantage is that in the stamp according to the present invention all the necessary components, such as the irradiation source, controller and energy source, are integrated into the stamp, so that the user does not need nor has to operate any other additional devices. The usual stamping sequence is not changed by simply compressing the stamp, so that very straightforward handling is achieved.

The measures in which the controller is activated, in particular switched on, before or during the stamping process are advantageous, wherein the controller activates, in particular switches on, during or immediately after the stamping process at least one or a plurality of irradiation sources aligned in the direction of an printing surface of the stamp on the stamp, in particular in the interior space, for the curing of the ink. This ensures that in a single operation by simply actuating the stamp simultaneously the controller is switched on and the stamp impression is generated and cured via the irradiation source, so that when the stamping process is completed the user can remove the stamp, preferably without any waiting time, so that the stamp impression generated can be wiped or scratched over, respectively, immediately afterwards. This stamp, with preferably UV-curable ink, is preferably used on surfaces that are difficult to stamp, such as glass, metal, aluminium, cardboard, wood, etc., wherein the state of the art comprises the use of inks with a high solvent concentration that evaporate after the stamping process, but require a drying time of more than 5 to 10 seconds.

The measures in which the controller activates, in particular switched on, at least one or a plurality of irradiation sources on the stamp during the return movement of the text plate from the stamping position to the resting position, in particular shortly before reaching or when reaching the resting position, are advantageous. This means that a great deal of energy in the energy storage device can be saved, since the irradiation source is switched on only in the final stage, i.e. after the stamp impression has been generated, and not at the beginning of the stamping process. Thus the duration of use of such a stamp is considerably increased with your charging cycle of the energy storage device.

Advantageous measures are also such in which the stamping insert and/or the text plate is formed in such a way that, in the resting position, it covers or closes, respectively, a pad of the ink cartridge with pad inserted that is soaked with preferably UV-UV-curable ink. This ensures that the text plate shields the UV light from the ink cartridge with pad upon activation in the return movement, so that unintentional curing of the ink in the ink cartridge with pad is avoided, for example when using a self-inking stamp that can be swiveled by 180°.

The measures in which the irradiation source is activated during or after the stamping process for a period of less than 2 seconds, preferably between 0.5 and 0.1 seconds, are advantageous. Here the advantage is that a high safety aspect for the protection of the eyes is guaranteed, as the switch-on time is very short, so that no injuries to the eyes can occur. Here it is also possible that when the stamp is lifted from the surface of the object, workpiece or document to be stamped while the light source is switched on, the latter is immediately deactivated by the controller, i.e. when the stamp is lifted the triggering is prevented, or the activated light sources are immediately deactivated, in order to avoid possible damage to the eyes of a user or another person in the vicinity. This ensures that a high safety aspect for the protection of eyes is guaranteed.

The measures in which the controller detects a position of the text plate or the top part and the bottom part relative to one another during the stamping process are advantageous, wherein the controller and/or the irradiation sources are activated in particular at certain detected positions. This ensures that the switch-on time for the irradiation source can be determined precisely, regardless of whether a user carries out a stamping process at high or low speed. At the same time, energy is saved considerably if the controller is activated only at a certain position during the stamping process, in order to achieve the longest possible running time per loading cycle.

Advantageous measures are such in which the detection of the text plate or the top part and the bottom part in relation to each other takes place via an integrated sensor system, preferably capacitive capacitor plates or elements, respectively, or via contact elements or magnetic switching elements. This enables or performs, respectively, non-contact detection and activation for the controller and/or irradiation source, so that the handling during the stamping process is not affected. In addition, the switch-on time for the controller and light sources can thus be changed variably, since the activation can take place depending on the field strength.

Advantageous measures are such in which the text plate is swiveled or rotated, respectively, from the resting position into the stamping position via a 90° or preferably 180° reversing mechanism, and that an ink cartridge with pad is used to hold the UV-UV-curable ink, against which the text plate abuts in the resting position. This makes it possible to use a commercially available stamp, as shown in the following exemplary embodiments. At the same time, the use of so-called self-inking stamps, in which the ink is absorbed by abutting against the pad of the ink cartridge with pad, has the great advantage that the stamping insert or text plate itself, respectively, serves or can be used, respectively, for shielding of the irradiation from the ink in the ink pad.

However, the measures in which one or several irradiation sources is or are, respectively, attached in the area of the printing surface of the stamp, in particular on a bottom part of the stamp, and/or on the rear side of the text plate, in particular on the side of a text plate holder projecting in the direction of the contact area, and/or on the bottom part, in particular on the upper side of the interior space, are also advantageous, wherein the light emission is aligned in the direction of the printing surface, in particular in the interior space of the bottom part of the stamp. This ensures that the UV rays from the irradiation sources are always emitted in the direction of the imprint produced on the surface of the object, workpiece or document, respectively, so that they activate and cure the entire curing process when impacting on the UV ink.

The advantage of this is that, depending on the size of the text plate, the number of irradiation sources used can be defined, taking into account their technical data. This ensures that full-surface irradiation of the printing surface is ensured with a wide variety of stamp sizes, as correspondingly more irradiation sources are used with larger stamping surfaces. The irradiation sources used, especially LEDs, can also be taken into consideration, as fewer of them are required if the LEDs are stronger.

Advantageous measures are such in which the controller is deactivated after a stamping process within a pre-settable period of time or directly when the irradiation sources go dark, wherein the controller remains activated during a new stamping process within the period of time for deactivating the controller. This ensures that energy can be saved as a result.

However, the measures in which the stamping components, in particular the bottom part, are designed as UV protection against the eyes are also advantageous, wherein a transparent viewing window is used for this purpose or, in the case of transparent surfaces, these are formed from UV-impermeable material, in particular made of polymethyl methacrylate or polyallyldiglycol carbonate, etc. This ensures that the transparent embodiment allows the stamp to be optimally positioned, while protecting the eyes or surroundings, respectively, from the UV rays emitted.

In addition, the measures in which the controller, the energy source and at least one or several irradiation sources form a unit or module, in particular a retrofit module, that is attached to or plugged onto the stamping insert, respectively, in particular on the opposite side of the text plate, are advantageous. This ensures that a standardised stamp can be equipped with such a module at any time, or the same can be removed if it is not used, respectively. Only the ink cartridge with pad needs to be replaced when such a module is used.

However, the objective of the invention is solved also by a process or method for producing a stamp impression with UV-curable ink in which a controller is activated, wherein after the generation of the stamp impression the stamp or an additional component of the stamp, in particular a protective cap, with light sources arranged thereon is manually aligned with the stamp impression, and the light sources are activated for irradiating the stamp impression.

The advantage of such a solution is that all the components are provided on the stamp or its accessories, i.e. no additional devices are required, and the user only needs to manually align the stamp or the additional components for the impression, respectively, in order to cure it by activating the light sources. This is an advantage in that stamps can likewise be used in which a shielding of the ink reservoir can be used, as is the case e.g. with flash stamps, since this simply needs to be turned sideways or upside down so that the rays of the irradiation sources cannot reach the ink reservoir. For such stamps with UV-curable ink curable by irradiation, preferably UV irradiation, it must be ensured that the irradiation does not reach the ink reservoir or ink cartridge with pad, respectively, otherwise the ink in the ink cartridge with pad or the ink reservoir, respectively, will itself be cured, rendering the cartridge with pad or ink reservoir, respectively, unusable.

However, the measures in which the irradiation source is activated for a period of less than 2 seconds, preferably between 0.5 and 0.1 seconds, are also advantageous. This ensures that a very short dwell time or alignment, respectively, is necessary, thus reducing the risk of the stamp impression being blurred.

Furthermore, however, the objective of the invention is also solved by a stamp, in which a controller with an energy source connected thereto, in particular a rechargeable button cell or battery, is arranged in or on, respectively, the stamping component, which controller is connected via leads to at least one or several irradiation sources arranged on the stamping component.

The advantage here is that the cable connection between the controller and the light source on the stamp can be used to easily activate the light source for curing the stamp impression. Activation is thus possible before, during or after the stamping process. Here it is also possible that the activation is carried out manually, for example via a button, and the controller corresponds to the time required for the complete curing of the ink to activate the light source. In an automatic process, the controller is preferably activated automatically, so that it switches on or activates, respectively, the irradiation sources for an adjustable period of time in a certain detected position of the text plate, especially after generating the stamp impression.

Advantageous embodiments are such in which the irradiation sources are arranged in such a way that their UV rays are aligned in the direction of a printing surface or the stamp impression produced, respectively. This ensures that in the stamping position the curing process takes place simultaneously via the rays of the light sources. This ensures that the stamp impression is generated simultaneously in one operation, and that the curing process is carried out without changing the position of the stamp. By appropriate dimensioning and optimised arrangement of the irradiation sources of the curing processes, i.e. switching on the light sources, it is possible to achieve a curing time of less than 2 seconds, in particular between 0.5 and 0.1 seconds, so that no dwell time is necessary after the stamping process.

In another advantageous embodiment, the irradiation sources on the stamp are arranged preferably on the top part or on the lateral surfaces for manual alignment to the printing surface. This ensures that other types of stamps, such as flash stamps, in which the stamping insert cannot protect the ink from the irradiation, can also be used, since in such stamps the stamp impression is first generated, then the stamp is rotated to the side on which the light sources are arranged and these are placed or held, respectively, above the stamp impression, whereupon the light sources are activated so that the stamp impression is cured by the rays emitted.

An advantageous embodiment is one in which the curable ink is provided in a replaceable ink cartridge with pad, in particular in a soaked pad, wherein in the resting position, with the ink cartridge with pad inserted, the text plate abuts against the pad for receiving the curable ink. This ensures that new ink is absorbed again after each stamping process, and thus a high imprint quality is achieved. At the same time, when the ink is used up, the ink cartridge with pad can be replaced rapidly, so that the stamp is quickly ready for use again.

In an advantageous embodiment, the text plate can be adjusted from the resting position to the stamping position by about 180° or 90° during a stamping process to generate the stamp impression in the stamping position, and the stamping insert with the text plate can be adjusted via a reversing mechanism from the resting position to the stamping position. This ensures that due to the rotary movement, the stamping insert simultaneously serves for generation of the stamp impression and for shielding of the ink cartridge with pad from the rays of the light sources.

However, it is also advantageous to have an embodiment in which the energy source and the controller are provided on an upper side of the bottom part, wherein the irradiation sources are attached to one or several surfaces of the bottom part in the area of an printing surface or contact area, respectively, and the irradiation source or irradiation sources are aligned in the direction of an interior space, in particular the printing surface. This ensures that the components required for the curing are all bundled in one part, so that only this part is subject to increased manufacturing effort.

An embodiment in which at least one or a plurality of irradiation sources is provided on the opposite side of the text plate, respectively, in particular on the stamping insert or text plate holder, is advantageous, wherein the controller and the energy source are also arranged on the stamping insert. This in turn ensures that all electrical components are arranged on one part, namely the stamping insert, so that the production of only one part is more time-consuming. At the same time, short cable connections can be achieved thanks to the compact design.

Advantageous embodiments, however, are also such in which the individual components for curing the ink, in particular the irradiation sources, the controller, the energy source, etc., are provided in a common housing to form a module which can be exchanged with the stamping insert. This allows easy retrofitting or replacement, so that a standard stamp can be easily converted to a special stamp by attaching the module to the stamping insert and inserting an ink cartridge with pad.

However, it is also advantageous to have an embodiment in which a transparent, replaceable protective cover is arranged above the irradiation source(s), which is preferably formed at the same time as a lens, especially a diverging lens, for better distribution of the UV rays in the interior space. This ensures that simple protection of the irradiation sources is achieved, since in case of contamination with the UV-curable ink and activation of the light source, the ink would cure immediately on the light source and thus this is no longer easily removable, so that the stamp would usually become unusable. With the protective cover, the same can be easily replaced if dirty, so that the stamp can continue to be used.

It is also advantageous to have an embodiment in which at least one or a plurality of irradiation sources is provided on the opposite side of the text plate, in particular on the stamping insert or text plate holder, respectively, wherein the controller and the energy source are arranged on the top part or bottom part or also on the text plate holder. This ensures that there is sufficient room in the interior space of the top part to accommodate the components, so that further additional functions that are difficult to accommodate in the bottom part can be easily installed.

Finally, an embodiment in which the irradiation sources are arranged in the top part and/or bottom part is also advantageous, wherein guide elements, in particular light guides and/or a mirror system, which deflect the emitted rays, in particular UV rays, in the direction of the printing surface, are arranged for irradiating the stamp impression. This ensures that the irradiation source is positioned at the place where sufficient space is available, since the irradiation source does not have to be arranged directly in the functional area to the printing surface due to the transmission of the irradiation. Such indirect lighting or irradiation, respectively, furthermore has the additional advantage that it allows easy access to the irradiation sources, since they can be accessed from outside at any time, for example via a cap.

It is emphasised that the advantages can be combined with each other, so that in order to avoid repetition not all advantages have always been mentioned.

The invention is described hereinafter in the form of exemplary embodiments, wherein attention is drawn to the fact that the invention is not limited to the exemplary embodiments or solutions, respectively, represented and described.

BRIEF DESCRIPTION OF THE DRAWINGS

The figures show:

FIG. 8—diagram of another exemplary embodiment of a Printy P4 4912 stamp with separately arranged components for the UV-UV-curable ink; simplified, for illustrative purposes only;

FIG. 9—longitudinal view of the stamp 1 according to FIG. 8; simplified, for illustrative purposes only;

FIG. 10—further cross-sectional view of the stamp in transverse direction according to FIG. 8; simplified, for illustrative purposes only;

DETAILED DESCRIPTION

It should be stated by way of introduction that, in the individual embodiments, the same parts are provided with the same reference numbers or same component designations, respectively, wherein the disclosures contained in the entire description can, by analogy, be transferred mutatis mutandis to identical parts with identical reference numbers or identical component designations, respectively. The position details selected in the description, such as, e.g., top, bottom, lateral, etc., relate to the figure described, and in the event of a change of position, they are to be transferred to the new position by analogy. Individual features or feature combinations from the exemplary embodiments shown and described may also represent independent inventive solutions.

Figure 1:
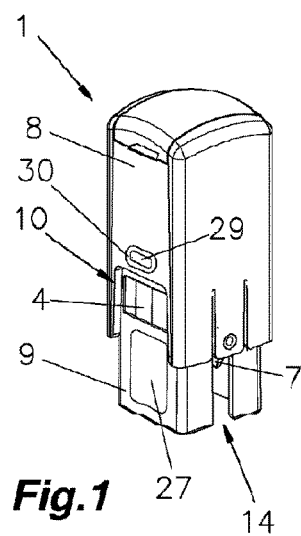
FIG. 1—an oblique view of a stamp, in particular a control stamp, from the outside in a resting position; simplified, for illustrative purposes only.
Figure 2:
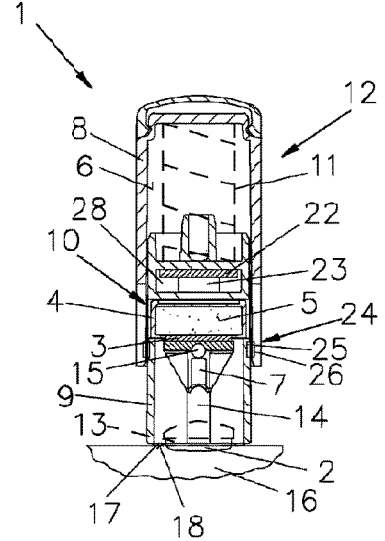
FIG. 2—sectional view in the transverse direction of the stamp, in particular of the control stamp, according to FIG. 1 in the resting position; simplified, for illustrative purposes only.
Figure 3:
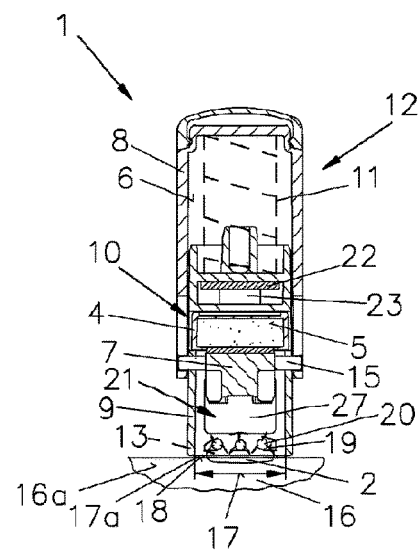
FIG. 3—sectional view in the longitudinal direction of the stamp, in particular of the control stamp, according to FIG. 1 in the resting position; simplified, for illustrative purposes only.

FIGS. 1 to 3 show an exemplary embodiment of a stamp 1, in particular a control stamp, having as a stamp impression 2 e.g. a QR imprint, personal characters, bar codes, etc., wherein the stamping surface, in particular the size of the text plate, measures preferably between 1 cm×1 cm and 4 cm×4 cm. Of course it is also possible to use smaller or larger stamping surfaces and other shapes such as rectangular, round, oval, triangular, etc. The embodiments in the individual exemplary embodiments of FIGS. 1 to 12 can likewise be combined with each other or exchanged.

The stamp 1 shown is a so-called self-inking stamp 1, in which a text plate 3 with the negative stamp impression 2 abuts against an ink cartridge with pad 4, in particular a pad impregnated with UV-curable ink 5, to absorb ink 5.

The stamp 1 is made up of a stamping component 6 and a stamping insert 7 with a text plate 3 attached, in particular glued, to it. The stamping component 6 consists at least of a top part 8 and a bottom part 9 with a cushion-receiving element 10. The top part 8 is formed cap-like and encloses the bottom part 9, wherein between the top part 8 and bottom part 9 a spring element 11, as shown schematically with dashed lines, is provided, so that when the stamp 1 is actuated the top part 8 is pushed from a resting position 12 over the bottom part 9 into a stamping position 13, as indicated schematically with dashed lines, and is then returned to the rest position 12 by the spring element 11, i.e. the stamp 1 is compressed, so to speak, in order to produce a positive stamp impression 2.

The stamping insert 3 is connected to the top part 8 via a reversing mechanism 14 formed by 180°, in the bottom part 9 connected so as to move synchronously via a shaft 15 or swivel pin 15, respectively, so that the stamping insert 7, as known from the state of the art, can move in the bottom part 9 from the resting position 12, according to FIGS. 1 to 3, in full lines, into the printing or stamping position 13 (as indicated dashed in FIGS. 2 and 3) by application of pressure. During a stamping process, the stamp 1 is placed on an object 16, documents 16, or workpiece 16, in particular with a smooth surface 16a which is difficult to stamp, over the printing surface 17 or contact area 17a, respectively, which is preferably equipped with rubber feet 18, and a stamping process is carried out so that the stamp impression 2, as shown schematically, is produced on the object 16, documents 16, or workpiece 16.

Since this stamp 1 is designed for surfaces which are difficult to stamp, such as glass, metal, in particular steel, aluminium, magnesium, plastics, etc., the ink cartridge with pad 4 is filled or impregnated, respectively, with UV-curable ink 5, wherein this ink 5 is activated and cured by UV rays 19 from at least one or several light sources 20. The one or a plurality of irradiation sources 20 is arranged in the stamp 1 in such a way that their UV rays 19 are aligned in the direction of the printing surface 17 or the generated stamp impression 2, respectively. In the exemplary embodiment shown in FIGS. 1 to 3, a total of six irradiation sources 20 (see FIG. 3) are arranged, wherein these are arranged in the bottom part 9, in particular in the area of the contact area 17a or printing surface 17, respectively, and emit into an interior space 21 of the bottom part 9 when activated. In order to increase the luminosity in the interior space 21 or to direct the UV rays 19 in the direction of the stamp impression 2, respectively, it is possible that inner surfaces of the bottom part 9 and/or the stamping insert 7 are provided with a reflection layer and/or reflection foil (not shown), so that the UV rays 19 emitted by the irradiation source 20 in the direction opposite the stamp impression 2 or printing surface 17 are reflected onto these surfaces, so that the UV rays 19 impacting on the stamp impression 2 are increased.

In order to activate the irradiation sources 20, however, it is necessary that a corresponding controller 22 or control electronics, respectively, and energy source 23 are arranged in the stamp 1, wherein the individual components, in particular the irradiation sources 20, controller 22 and energy source 23, are connected to each other via lines that have not been shown, as these are integrated in the parts of stamp 1. As a matter of form, it is pointed out that the cables and other components can already be injected or embedded, respectively, during production in an injection moulding process.

According to the present invention, it is thus possible that in a single step, in particular a single stamping process, a stamp impression 2 is produced from a UV-UV-curable ink 5 and cured with UV rays 19 from irradiation sources 20. I.e., in order to produce the stamp impression 2 with UV-curable ink 5 with a preferably self-inking stamp 1, the text plate 3 with the negative stamp impression 2 is moved from a resting position 12 into a stamping position 13, whereby in the stamping position 13 the stamp impression 2 with the UV-curable ink 5 that has been adsorbed by the text plate 3 from the ink cartridge with pad 4 is produced on a preferably smooth surface 16a of the object 16 or workpiece 16 or document 16, and then the text plate 3 is returned to the resting position 12, wherein the controller 22 is activated and, for the curing of the ink, at least one or several irradiation sources 20 arranged on the stamp 1 and aligned in the direction of an printing surface 17 are switched on.

For example, it is possible that a switching element (not shown) for manually activating the controller 22 and possibly for simultaneously activating the irradiation source 20 (for this purpose a separate controller element can however be arranged) is provided on the stamp 1, so that the controller 22 is preferably activated via the switching element before the stamping process. Then the stamp impression 2 is generated by a stamping process, wherein the stamp 1 is not removed from the position, so that by activating the light sources 20 the UV rays 19 are emitted, whereupon the stamp 1 can be removed from the position. However, it is also possible that the switching element is formed as a push-button (not shown), so that after generating the stamp impression 2 by pressing the push-button the controller 22 and the irradiation sources 20 are activated, so that again the UV-curable ink 5 is cured by the UV rays 19. The disadvantage of the two processes described is that after the stamping process the stamp 1 must be left in the stamping position in order to activate the irradiation sources 20 for curing, so that the UV rays 19 can cure the still moist and easily smeared stamp impression 2. This can produce very good impression results, but the time required for a stamping process is very long. There is also the danger that after the stamping process the stamp impression 2 can be blurred or destroyed, respectively, easily by the rubber feet 18 upon moving of the stamp 1.

Preferably, the stamp according to the present invention 1 and its method provide for automatic or independent, respectively, recognition of a possible stamping process, so that the controller 22 is automatically activated and the irradiation source 20 is likewise automatically switched on and off, whereupon to save energy the controller 22 is always activated as briefly as possible, so that a high number of stamps can be generated with a charged energy source 23. Preferably, the capacity of the energy source 23 is dimensioned in such a way that up to 1000 stamp impressions can be generated with one charge, or that, in case of use in shift operation, one shift can manage with one charge, i.e. in the automotive industry, for example, the safety stamp 1 is removed from the loading station at the start of a shift and then has sufficient energy available for the entire shift.

According to the present invention, it is provided that before or during the stamping process the controller 22 is activated, in particular switched on, wherein during or immediately after the stamping process the controller 22 activates, in particular switches on, at least one or several irradiation sources 20 on the stamp 1 aligned in the direction of a printing surface 17 of the stamp 1 for the curing of the ink 5, i.e., when the stamp 1 is placed on the object 16, workpiece 16 or document 16, respectively, this is detected e.g. by a touch button (not shown) or by a capacitive sensor system 24, so that the controller 22 for switching on the irradiation sources 20 at lightning speed is activated in advance, whereupon the controller 22 monitors whether and when a stamping process is carried out, so that at a specific time or a specific position of the text plate 3 or stamping insert 7, respectively, the light sources 20 are activated for an adjustable period of time. This ensures that the user carries out a simple stamping process as usual and can immediately remove the stamp 1 again after the stamping process has been completed.

During the return movement of the text plate 3 from the stamping position 13 to the resting position 12, in particular shortly before reaching or when reaching the resting position 12, preferably at least one or a plurality of irradiation sources 20 on the stamp 1 is activated, in particular switched on, because this ensures that a stamp impression 2 has already been generated and therefore no energy is consumed unnecessarily. In addition, the stamping insert 7 with the text plate 3 covers the UV rays 19 in the direction of the ink cartridge with pad 4, so that an unintentional curing of the ink 5 in the ink cartridge with pad 4 is avoided. It is therefore advantageous if the irradiation source 20 is supplied with energy from the energy source 23 by the control electronics 22 preferably only immediately before reaching the resting position 12 or during or shortly after reaching the resting position 12. The position can, for example, be determined via the capacitive sensor system 24, in which a capacitive element 25, 26, in particular capacitor plates, is embedded in the bottom part 9 and in the top part 8 at the specific position, wherein a capacitive field is built up between the elements 25, 26, so that the capacitive field decreases at the beginning of the stamping process, since the top part 8 is pressed downwards, so that the controller 20 is activated and at the end of the stamping process the field is increased again, so that the exact switch-on position for the light sources 20 can be determined by corresponding evaluation of the field strength. Of course, it is also possible to use another type of sensor system 24, for example with micro-switches, light barriers, contact elements, magnetic switching elements, etc.

Thus, for the curing of the ink 5, the irradiation source 20 is activated for a defined period of time, which can be set on or via, respectively, the controller unit 22, wherein the length of this period is far below the drying times known from the state of the art for safety stamps, which according to the state of the art range from 10 seconds to several minutes. According to the present invention, the irradiation source 20 is to be activated during or after the stamping process for a period of less than 2 seconds, preferably between 0.5 and 0.1 seconds, so that the irradiation source 20 is already deactivated again when the stamp 1 is lifted from the object 16 or workpiece 16 or document 16, respectively. Only this short period of time makes it possible that such a process with stamping and curing is possible in one working step and one device, namely preferably a hand stamp 1. In order to achieve such short exposure times, however, it is necessary that sufficient UV rays 19 act on the stamp impression 2, so that preferably several irradiation sources 20 are used. One or two irradiation sources 20 are preferably used per 0.5 cm$^2$ to 1 cm$^2$ stamping surface, i.e. the larger the stamping surface of the stamp 1, the more irradiation sources 20 are required and used for optimum curing, wherein the power of the irradiation source 20 must be taken into account. Preferably LEDs with a wavelength of 420 nm to 365 nm are used according to the current state of the art.

With the safety stamp 1 shown in FIGS. 1 to 3, a stamping surface of approx. 2 cm$^2$ is possible, so that six irradiation sources 20 or six LEDs, respectively, are used to achieve a sufficient amount of energy or luminosity in the short exposure time or duration, respectively, of less than 2 seconds, preferably between 0.5 and 0.1 seconds. The irradiation sources 20 are arranged in the bottom part 9 in the area of the contact area 17*a* or printing surface 17, respectively, wherein the light sources 20 emit in the direction of the printing surface 17 into the interior space 21 of the bottom part 9. Here it is possible that for shielding against the UV rays 19 the side surface of the bottom part 8 is formed so as to be opaque, so that no rays can penetrate to the outside due to the eye protection. This is possible with safety stamps 1 of this type, as the printing surface 17 is kept very small and positioning is therefore simple. Of course, it is also possible that a transparent viewing window 27 is arranged for improved positioning, so that the user can look through the viewing window 27 into the interior space 21 and thus exact alignment is possible. Here, the viewing window 27 is made of a UV-impermeable material, in particular plastic, so that no UV rays 19 can penetrate through the viewing window 27 to the outside. As a matter of form, it is pointed out that in lieu of a viewing window 27, part or all of the surface of the bottom part 9 can be made from such a transparent UV-impermeable material or plastic, respectively.

In this exemplary embodiment, the position of the controller 22 and the energy source 23 is also on the bottom part 9, so that all the required cables have to be integrated only into the bottom part 9, so that the energy supply via the cables is not impeded by any moving sequences or elements, respectively. The controller 22 and the energy source 23 are preferably arranged between the spring element 11 and the ink cartridge with pad 4 in a free space 28 created for this purpose. However, it is also possible that the spring element 11 rests directly on a component, so that the energy source 23 and the controller 22 are fixed or arranged, respectively, on the surface of the bottom part 9. Of course it is also possible that the controller 22 and the energy source 23 are located in the interior space 21 above the ink cartridge with pad 4. It is also possible that the controller 22 and the energy source 23 are arranged separately from each other, wherein for example the controller 22 is positioned in the interior space 21, preferably above the ink cartridge with pad 4, and the energy source 23 is positioned on the surface of the bottom part 9 near the spring element 11, so that the energy source is easily exchangeable.

It is advantageous if on the stamp 1 an interface 29, as schematically shown in FIG. 1, is arranged so that it can be reached through an opening 30 or recess in the top part 8, which is connected to the controller 22, so that data exchange can preferably be carried out for setting the controller 22, in particular the duration or switch-on time, respectively, for the light sources 20, the activation time, etc., and so on. This interface 29 can also be used simultaneously for charging the energy source 23.

As a matter of form, it is also mentioned that the ink cartridge with pad 4, as known from the state of the art, can be easily replaced by slightly compressing the stamp 1 so that the text plate lifts off from the pad impregnated with UV-curable ink 5 and then the ink cartridge with pad 4 can easily be pressed outwards and removed. Simplicity of the ink cartridge replacement is important, as the pad can be soaked again when the ink 5 is used up, or a replacement cartridge with pad already soaked with UV-curable ink 5 can be used as a new ink cartridge with pad 4, in order to quickly have a usable stamp 1 available again. Here it is advantageous that the individual stamping processes, which are detected by the sensor system 24 on the basis of the detection, are counted via the controller 22, and that information or a warning tone or signal tone, respectively, is emitted when a predefined number of stampings is reached, so that the user can check the imprint quality or replace the ink cartridge with pad 4 on the basis of quality requirements.

Figure 4:
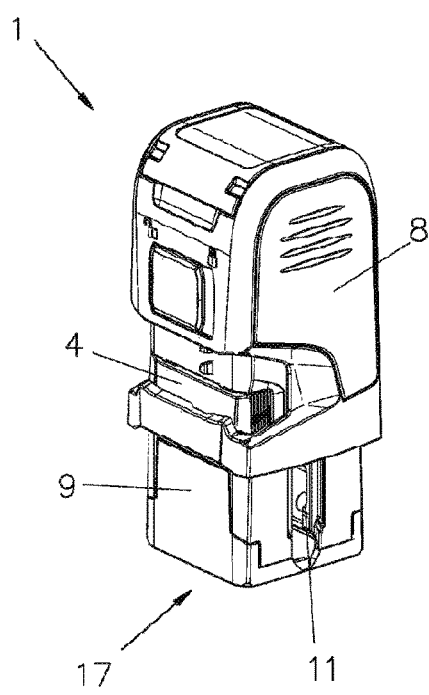
FIG. 4—diagram of a Printy P4 series stamp of the manufacturer with a modified arrangement of the irradiation sources; simplified, for illustrative purposes only.
Figure 5:
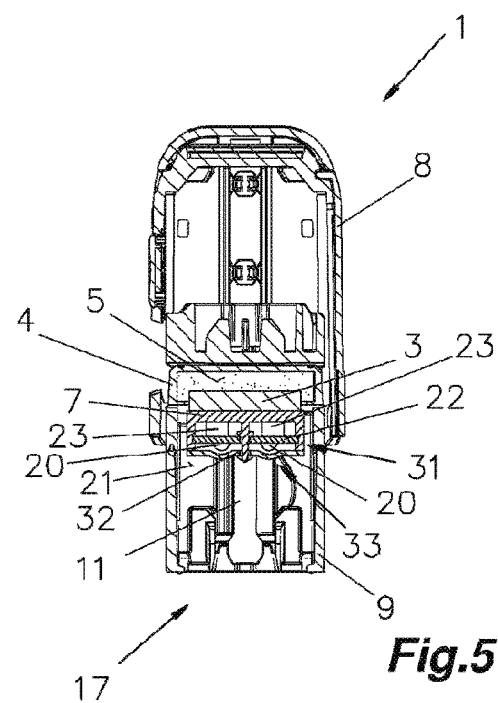
FIG. 5—sectional view of the stamp according to FIG. 4; simplified, for illustrative purposes only.

FIGS. 4 and 5 show another exemplary embodiment of a stamp 1 with UV-curable ink 5. This is once more a so-called self-inking stamp 1 from the applicant's Printy P4 series. The main difference from the applicant's Printy P2 series stamp shown in FIGS. 1 to 3 is that the ink pads are removed differently, as can be taken from WO 2011/020608 A or AT 507833 A, respectively, and their family members, wherein the construction is essentially the same, only the construction size, in particular the size of the text plate 3, is different, so that the construction is not disclosed in further detail.

Due to the use of UV-curable ink 5, it is necessary here, too, that the stamp impression 2 (not shown) must be irradiated with UV rays 19 from one or several irradiation sources 20 in order to trigger the curing reaction. For otherwise it would take a very long time for the stamp impression 2 to be cured by the solar UV radiation, so that the stamp impression 2 could be easily blurred or removed, respectively.

In contrast to the first exemplary embodiment, the irradiation sources 20 are now arranged on the stamping insert 7. The irradiation sources 20 are arranged on the opposite side to the text plate 3 so that they are aligned in the direction of the printing surface 17. The controller 22 and the energy source 23 are also arranged on the stamping insert 7. Thus it is possible that the light sources 20 are soldered directly to the controller 22, especially the controller board, so that no cables outside the controller 22 are necessary. The energy source 23 can also be provided directly on the controller, especially on the opposite side to the irradiation sources 20. It can thus be said that the controller 22, the energy source 23 and the irradiation sources 20 form a common unit or module 31, respectively, which is directly attached to the stamping insert 7. Here it is also possible that, due to the modular design, the module, consisting of the controller 22, the energy source 23 and the irradiation sources 20, is arranged in an independent housing, which is attached to or plugged onto, respectively, the stamping insert as an additional component, for example via a snap-in connection. Thus, a commercially available stamp 1 can be retrofitted with such a module 31 at any time, wherein an additional ink cartridge with pad 4 soaked with UV-curable ink 5 must be additionally used here.

To protect against soiling, it is possible that a transparent, replaceable protective cover 32 is provided, which is preferably concomitantly formed as a lens 33, in particular a diverging lens, for better distribution of the UV rays 19 in the interior space 21. Thus it is no longer possible that during a stamping process in which the stamping insert 7 is rotated by 180° via the reversing mechanism, the irradiation sources 20 can be soiled with ink 5, which would cure immediately upon activation of the irradiation sources 20 and would therefore no longer be removed from the irradiation sources, or would be only with great difficulty, respectively. If, on the other hand, the protective cover 32 is soiled, it can be easily replaced at any time, as the protective cover 32 is simply snapped onto module 31 or cover unit 7, respectively. A further essential advantage, however, lies in the function as lens 33, since here the UV rays 19 can be optimally scattered in the interior space 21 of the bottom part 9.

In this exemplary embodiment, it is advantageous if the interface 29 (not shown) is provided on module 1 so that it can be contacted through the interior space 21. It is also possible to remove module 31 for charging the energy storage device or the energy source 23, respectively, or for data exchange. Thus, it is possible that another charged second module 31 is used, and the stamp 1 is immediately ready for use again. In this exemplary embodiment, too, it is provided once more that a position of the text plate 3 is detected by the controller 22 during the stamping process, wherein in particular at certain detected positions the controller 22 and/or the irradiation sources 20 are activated, as already described in the exemplary embodiment of FIGS. 1 to 3 and can be transferred to this exemplary embodiment of FIGS. 4 and 5, so that for the sake of clarity this was not shown anymore. The detection of the text plate 3 or the stamping insert 7, respectively, is again preferably carried out capacitively via integrated capacitor plates or via contact elements or magnetic switching elements.

With this stamp 1 of the exemplary embodiment 4 and 5, a stamping surface of approx. 2-3 cm$^2$ can once more be generated with a corresponding text plate 3, wherein only 2 irradiation sources 20 are now used, since the UV rays are distributed via the lens 33. As a matter of form, however, it is mentioned that several irradiation sources 20, for example four or six irradiation sources 20 in the form of UV-LEDs, are also used.

Figures 6, 7:
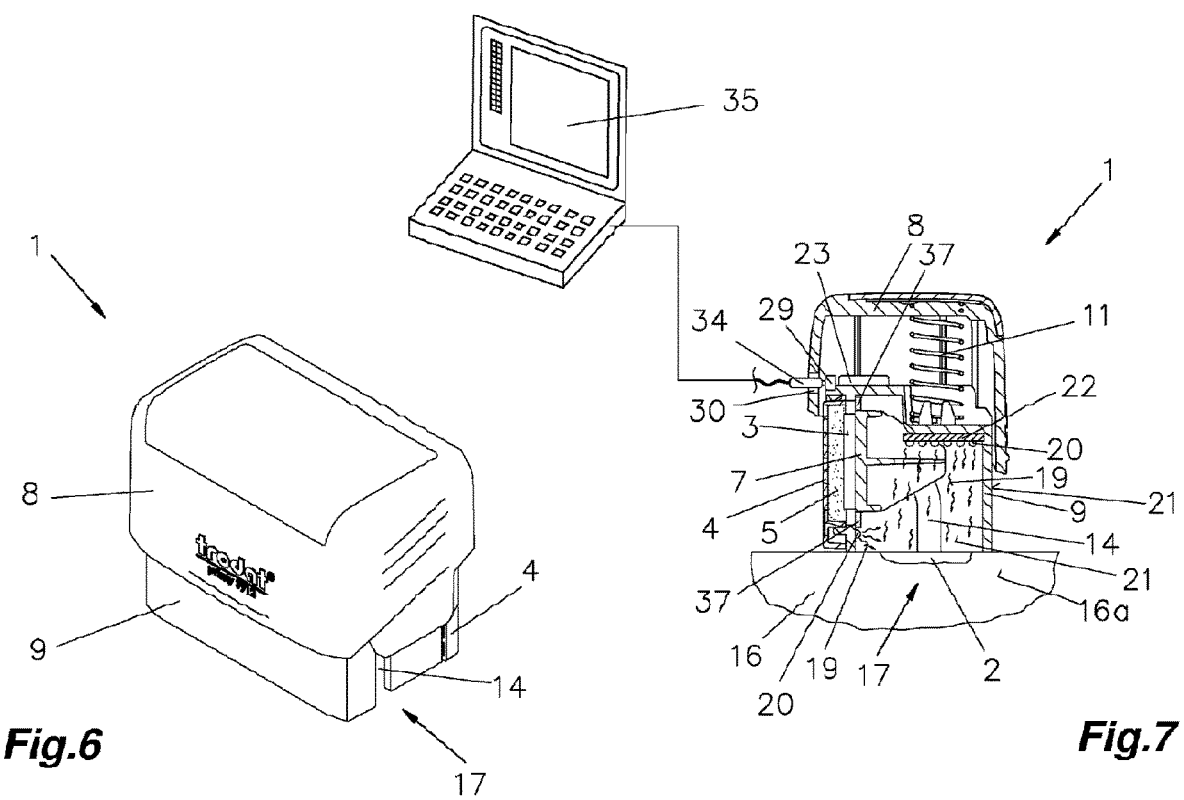
FIG. 6—another exemplary embodiment of a stamp with a 90° reversing mechanism and a changed arrangement of the irradiation sources; simplified, for illustrative purposes only.
FIG. 7—sectional view of the stamp according to FIG. 6; simplified, for illustrative purposes only.

In the exemplary embodiment of FIGS. 6 to 7, a stamp 1 with a 90° reversing mechanism 11 by the applicant is, for example, the one with the trade mark designation "3912" based on documents WO2012/159728 A or AT 511453 B, respectively, so that the specific structure is not disclosed in detail, as this can be taken from the publications.

Stamp 1 is connected via an interface cable 34 to an external component, in particular a computer 35 and/or charger, for charging and data exchange in the resting position 12, as shown schematically in FIG. 7.

In the case of the stamp 1, once more all the components required for the UV-curable process, in particular the irradiation source 20, the controller 22, the energy source 23, the interface 29, etc., are arranged on the bottom part 9. However, since the stamping insert 7 of the so-called 90° stamp 1 shown is arranged at an angle of 90° to the printing surface 17 or the object 16, workpiece 16 or document 16, respectively, in the resting position 12, sufficient room is created in the interior space 21 to provide the irradiation sources 20 between the stamping insert 7 and a front side 36 of the stamp 1. In the resting position 12 or immediately in front of it, when the irradiation sources 20 are activated, the UV rays 19 can be emitted unhindered in the direction of the printing surface 17 without being obstructed by the stamping insert 7. At the same time, the stamping insert 7 serves as a cover for the ink cartridge with pad 4, in particular the pad soaked with UV-curable ink 5 in the ink cartridge 4, so that no UV rays 19 can reach the ink pad 4 in the interior space 21. For this purpose, it is possible that cover elements 37, which are preferably of elastic design so that they can easily be deformed when they hit the housing, are arranged on the stamping insert 7 or on the ink cartridge with pad 4 itself.

A further difference from the exemplary embodiment described above is in the fact that with this stamp 1, in addition to the light sources 20 attached to the controller unit 22, additional light sources 20 are arranged in the area of the printing surface 17, as schematically indicated below the stamping insert 7, so that the light sources 20 can be distributed over several positions in the interior space 21 for better illumination of the entire printing surface 17.

FIGS. 7 to 9 show a further exemplary embodiment of the arrangement of the essential components in the stamp 1, wherein the stamp 1 as shown is again a well-known model of the Printy P4 series, namely a P4 4912, by the applicant. The structure of the stamp 1 can be taken from the granted European patents EP 2591921 B, EP2384283B, EP2591919 and EP25991920B, so that the details are not addressed here anymore.

In this embodiment, the individual components, in particular the light sources 20, the controller 22, the energy source 23, etc., are now arranged separately from each other. The controller 22 and energy source, as well as all other parts, such as the interface 29 (not shown), are arranged in the top part 8, whereas the light sources 20 are arranged in the bottom part 9, in particular in the interior space 21 of the bottom part 9, for irradiating the printing surface 17. The main advantage of this solution is that it allows use of a much more extensive controller 22 and a larger energy source 23 or several additional components, such as the interface, etc., respectively, since there is much more room available than is possible in the bottom part 9. It is also possible that by forming a so-called double bottom (not shown), access to the electrical or electronic components, respectively, from the outside can be made possible. It is also possible to arrange the controller 22, the energy source 23 and other components, such as the interface 29, on the outside of the top part 8, for example below the transparent window element 38 for inserting a sample imprint, and to lead the cables required for control and energy supply to the light sources 20 inwards.

However, in order for the feeding of the light sources 20 to take place in bottom part 9 in such a design, an electrical connection must be established between top part 8 and bottom part 9. This can be done, for example, by using conductive shafts 15 or electrically conductive inserts 39 in the area of the axes 15, via which a so-called sliding contact 40 is produced with the reversing mechanism 14, in particular the guide groove, so that the energy is conducted from the top part 8 via the inserts 39 of the sliding contact 40 to the bottom part 9 and thus the light sources 20 are supplied with energy for emitting the UV rays 19 for a defined period of time, as shown schematically. However, it should also be noted that flexible cables can be used to connect the top part 8 with the bottom part 9, which can compensate for the pushing together or compressing, respectively, of the two parts. It is essential that in such an embodiment the bottom part 9 is electrically connected to the top part 8 in order to transfer the energy so that sufficient energy is made available to the light sources 20 in the bottom part 20.

Figure 11:
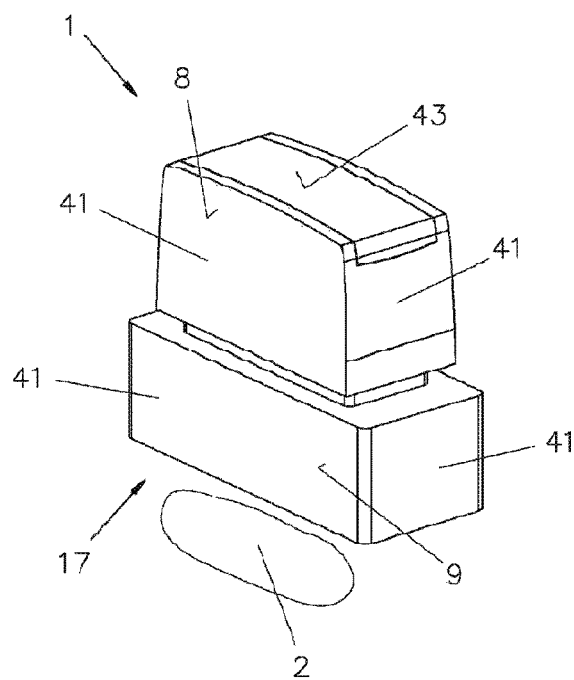
FIG. 11—a further exemplary embodiment of a stamp in which the irradiation source is located on the outer surface of the stamp so that the stamp must be aligned manually; simplified, for illustrative purposes only.
Figure 12:
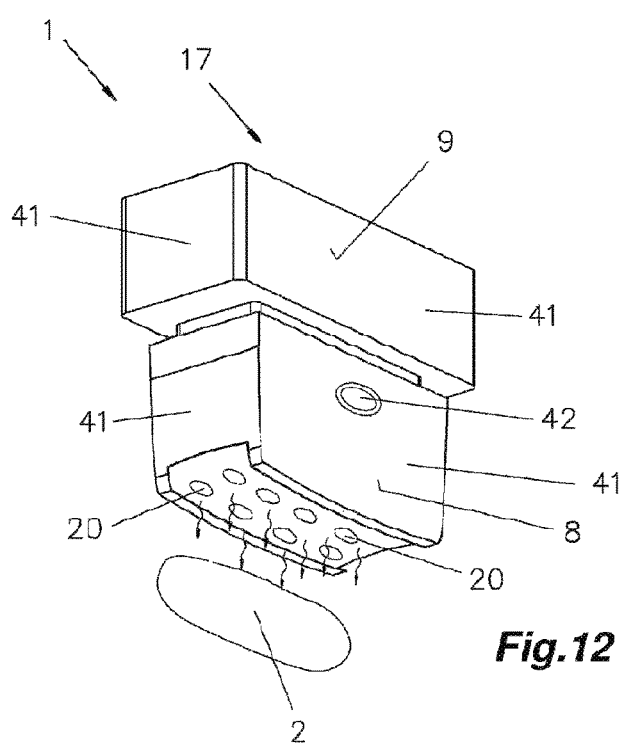
FIG. 12—the stamp according to FIG. 11 in a position aligned with the stamp impression 2; simplified, for illustrative purposes only.

FIGS. 11 and 12 show a further exemplary embodiment of a stamp 1, wherein now a so-called flash stamp 1 is now used, in which the ink 5 seeps through the text plate 3 and thus a stamp impression 2 can be produced, wherein the detailed design of the stamp 1 and its mode of operation are not disclosed here in more detail, as a large number of such systems are already known for this purpose.

In this variant, the irradiation sources 20 are arranged on the stamp 1, preferably on the top part 8 or on side surfaces 41, for manual alignment with the printing surface 17, i.e. first the stamp impression 2 is generated in accordance with FIG. 11, then the stamp 1 is turned over in accordance with FIG. 12, and e.g. by activating a button 42 the light sources 20, which are directed manually in the direction of the stamp impression 2, are switched on, wherein the controller 20 carries out the controller over the duration.

Furthermore, it can be seen from the exemplary embodiment that the light sources 20 are provided on the upper side of the top part 8, in particular underneath a cover 43, so that the light sources 20 are protected against soiling. As a matter of form, however, it is pointed out that the light sources 20 can also be provided so as to be exposed, or embedded in a recess so that the stamp 1 can be placed over the stamp impression 2, and upon activation of the light sources 20 the same start the curing process.

Figure 13:
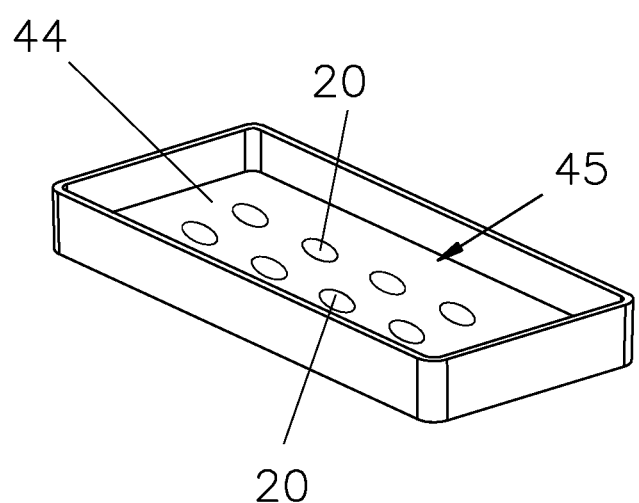
FIG. 13—a protective cap for the stamps according to FIGS. 1 to 12 with integrated irradiation source; simplified, for illustrative purposes only.

A further possibility of the arrangement of the light sources 20 is shown in FIG. 13, where the light sources 20 are arranged in a protective cap 44 of the stamp 1. The light sources 20 are preferably arranged in the interior area 45, so that the protective cap 44 can simply be placed over the stamp impression 2, and the light sources 20 can be switched on with the button 42 (not visible) on the side opposite the light sources 20. Of course it is also possible to arrange the light sources 20 on the outside of the protective cap 44.

By using the additional component of the stamp 1, it is possible to easily integrate the controller 20 and the energy source 23 as well as other additional components such as the interface 29, since there is sufficient room to accommodate the components.

According to the present invention, it is thus possible that a method or process, respectively, for producing a stamp impression 2 with curable ink 5 is created, in which the text plate 3 with the negative stamp impression 2 is moved from a resting position 12 into a stamping position 13, whereby in the stamping position 12 the stamp impression 2 with the ink 5 is produced on a preferably smooth surface 16a of a document 16 or object 16 or workpiece 16, and then the text plate 3 is returned to the resting position 12, whereby a controller 22 is activated, wherein after generation of the stamp impression 2 the stamp 1 or an additional component of the stamp 1, in particular a protective cap 44, with light sources 20 arranged thereon, is manually aligned with the stamp impression 2 and the light sources 20 are activated for irradiating the stamp impression 2.

It is also possible that additionally further safety measures can be integrated in the stamp 1. For example, one or several, in particular four, switching elements or contact switches can be installed at the rubber feet 18, so that when the stamp 1 is placed on an object 16, workpiece 16 or document 16, these are activated or deactivated and thus release a UV-curable stamping process. This prevents the irradiation source 20 from being activated unintentionally when a user compresses the stamp 1 in the air, since the stamp 1 must have been placed on an object 16, workpiece 16 or document 16.

In addition, indirect irradiation (not shown) of the stamp impression 2 with the UV rays 19 is also possible, where the irradiation source 2 is not aligned directly in the direction of the stamp impression 2, but the rays 19 are received by a guide element and subsequently deflected or transported, respectively, in such a way that the rays run or emanate, respectively, in the direction of the printing surface 17 or of the stamp impression 2 upon leaving the guide element. I.e., the irradiation source 20 is arranged in the top part 8 and/or bottom part 9, wherein for irradiating the stamp impression 2 guide elements, in particular light guides, mirror system are arranged, which deflect the emitted rays, in particular UV rays 19, in the direction of the printing surface 17.

As a matter of form, it is pointed out that the protective cap 44 can be formed to match the self-inking stamps according to FIGS. 1 to 10, as well as the flash stamp according to FIGS. 11 and 12, wherein this can be adapted according to the design, as it is known from the state of the art.

As a matter of form, it should finally be emphasised that, for better understanding, drawings have in part been represented not to scale and/or enlarged and/or reduced in size. It is also pointed out that the individual exemplary embodiments in FIGS. 1 to 10, in particular the arrangement of the elements for the curing process, are interchangeable and are not limited to the exemplary embodiment shown.

In addition, individual features or feature combinations from the various exemplary embodiments shown and described can inherently form independent inventive solutions or solutions according to the present invention.

The invention claimed is:

1. A method for producing a stamp impression with UV-curable ink with a self-inking stamp and a stamp for this purpose, the method comprising:
    moving a text plate bearing a negative of the stamp impression from a resting position into a stamping position, whereby in the stamping position the stamp impression with the ink is produced on a document or object or workpiece; and
    returning the text plate via a return movement to the resting position, wherein a controller is activated, wherein for the curing of the ink at least one or several irradiation sources arranged on the stamp is or are, respectively, switched on with UV rays aligned in the direction of a printing surface.

2. The method according to claim 1, wherein the controller is activated before or during the stamping process, wherein the controller activates during or immediately after the stamping process, at least one or several irradiation sources aligned in the direction of a printing surface of the stamp on the stamp in the interior space for the curing of the ink.

3. The method according to claim 1, wherein during the return movement of the text plate from the stamping position to the resting position the controller activates the at least one or several irradiation sources on the stamp.

4. The method according to claim 1, wherein one or both of a stamping insert and the text plate is formed in such a way that in the resting position the one or both of the stamping insert and the text plate covers or closes, respectively, a pad of an inserted ink cartridge with pad that is impregnated with UV-UV-curable ink.

5. The method according to claim 1, wherein the irradiation source is activated during or after the stamping process for a period of less than 2 seconds.

6. The method according to claim 1, wherein a position of the text plate or a top part and a bottom part relative to one another is detected by the controller during the stamping process, wherein one or both of the controller and the irradiation sources are activated at certain detected positions.

7. The method according to claim 6, wherein the detection of the text plate or the top part and the bottom part relative to one another takes place via an integrated sensor system or via contact elements or magnetic switching elements.

8. The method according to claim 1, wherein the text plate is swiveled or rotated, respectively, by 90° from the resting position into the stamping position via a reversing mechanism, and in that an ink cartridge with pad, against which the text plate abuts in the resting position, is used to hold the UV-curable ink.

9. The method according to claim 1, wherein one or a plurality of irradiation sources is or are attached at one of or a combination of in the area of the printing surface of the stamp on a rear side of the text plate and on a bottom part of the stamp on an upper side of an interior space, wherein a light emission is aligned in the direction of the printing surface in the interior space of the bottom part of the stamp.

10. The method according to claim 1, wherein depending on the size of the text plate, the number of irradiation sources used is defined, taking into account their technical data.

11. The method according to claim 1, wherein the controller is deactivated after a stamping process within a pre-determinable time period or directly when the irradiation sources go dark, wherein the controller remains activated during a new stamping process within the time period for deactivating the controller.

12. The method according to claim 1, wherein stamping components of a bottom part of the stamp are designed as UV protection against user eyes, wherein a transparent viewing window is used for this purpose or, in the case of transparent surfaces, these are formed from UV-impermeable material.

13. The method according to claim 1, wherein the controller, an energy source and at least one or a plurality of irradiation sources form a retrofit module that is plugged onto the stamping insert.

14. A method for producing a stamp impression with UV-curable ink, the method comprising:
moving a text plate bearing a negative of the stamp impression and included in a stamp from a resting position into a stamping position, whereby in the stamping position the stamp impression with the ink is produced on a surface of a document or object or workpiece;
returning the text plate via a return movement to the resting position, wherein a controller is activated;
manually aligning the stamp or a protective cap of the stamp, with light sources arranged thereon, with the stamp impression after the stamp impression has been generated; and
activating the light sources for irradiating the stamp impression.

15. The method according to claim 14, wherein the light sources are activated for a period of less than 2 seconds.

16. A stamp, comprising at least one stamping component and one stamping insert, wherein the stamping component is formed from a top part and a bottom part with a cushion-receiving element for receiving an ink cartridge with pad, wherein a text plate is fastened to the stamping insert, and during a stamping process, the stamping insert can be shifted from a resting position into a stamping position for producing a stamp impression formed from UV-curable ink and back again into the resting position, wherein a controller with an energy source connected thereto is arranged in or on the stamping component and is connected via leads to at least one or several irradiation sources provided on or at the stamping component.

17. The stamp according to claim 16, wherein the irradiation sources are arranged in such a way that their UV rays are aligned in the direction of a printing surface or the generated stamp impression, respectively.

18. The stamp according to claim 16, wherein the irradiation sources on the stamp are arranged on the top part or on side surfaces for manual alignment with a printing surface.

19. The stamp according to claim 16, wherein the UV-curable ink is provided in an exchangeable ink cartridge with an impregnated pad, wherein the text plate for receiving the UV-curable ink abuts against the pad in the resting position when the ink cartridge with pad is inserted.

20. The stamp according to claim 16, wherein the text plate, during a stamping process for generating the stamp impression in the stamping position, the stamping insert with the text plate can be adjusted by approximately 180° or 90° from the resting position into the stamping position via a reversing mechanism.

21. The stamp according to claim 16, wherein the energy source and the controller are provided on an upper side of the bottom part, wherein the irradiation sources are attached to one or several surfaces of the bottom part in the area of a printing surface or contact area, the irradiation source or irradiation sources, respectively, being aligned in the direction of an interior space.

22. The stamp according to claim 16, wherein at least one or several irradiation sources are provided on the opposite side of the text plate, wherein the controller and the energy source are also arranged on the stamping insert.

23. The stamp according to claim 16, wherein the irradiation sources, the controller, and the energy source are arranged in a common housing to form a module that can be connected with the stamping insert in a manner that allows replacement.

24. The stamp according to claim 16, wherein a transparent, replaceable protective cover is provided above the irradiation source or irradiation sources and is formed simultaneously as a lens for better distribution of UV rays in the interior space.

25. The stamp according to claim 16, wherein at least one irradiation source is arranged on the stamping insert or text plate holder, respectively, wherein the controller and the energy source are arranged on the top part or bottom part or on the text plate holder.

26. The stamp according to claim 16, wherein the irradiation source is provided in one or both of the top part and bottom part, wherein guiding elements are provided for irradiating the stamp impression.

* * * * *